United States Patent [19]

Tuttle et al.

[11] 4,176,254
[45] Nov. 27, 1979

[54] EMERGENCY ROADSIDE TELEPHONE SYSTEM

[75] Inventors: Lauren P. Tuttle, Herndon; Paul H. Dluehosh, Manassas, both of Va.

[73] Assignee: Telcom, Inc., Vienna, Va.

[21] Appl. No.: 864,869

[22] Filed: Dec. 27, 1977

[51] Int. Cl.² .......................................... H04M 11/04
[52] U.S. Cl. ..................................... 179/5 R; 179/2 E
[58] Field of Search .................... 179/2 E, 2 EB, 5 R; 325/53

[56] References Cited

U.S. PATENT DOCUMENTS

| | | | |
|---|---|---|---|
| 3,441,858 | 4/1969 | Graham | 325/64 |
| 3,622,999 | 11/1971 | Getz et al. | 325/53 |
| 3,939,417 | 2/1976 | Cannalte et al. | 325/53 |
| 3,986,119 | 10/1976 | Hemmer, Jr. et al. | 325/53 |
| 4,040,013 | 8/1977 | Carlson | 179/5 R |

OTHER PUBLICATIONS

"Characteristics of Motorist Aid Communications Systems", T. Cranston et al., IEEE Trans. Veh. Tech., vol. VT-19, No. 1, 2/1970, pp. 74–81.

*Primary Examiner*—Kathleen H. Claffy
*Assistant Examiner*—Kenneth A. Chayt
*Attorney, Agent, or Firm*—Rose & Edell

[57] ABSTRACT

An emergency roadside telephone system includes a plurality of self-powered, emergency telephone terminals positioned at remote locations, such as along roadways, to permit communication with a central station in order to obtain emergency assistance. Each emergency telephone terminal has a transmitter and a receiver for communication with the central station, a handset for providing voice communication and a plurality of emergency switches carrying symbols representative of various types of emergency assistance required such that a caller can request emergency assistance either by voice communication with an operator at the central station or, if there is a language barrier, by actuating the emergency switches.

8 Claims, 4 Drawing Figures

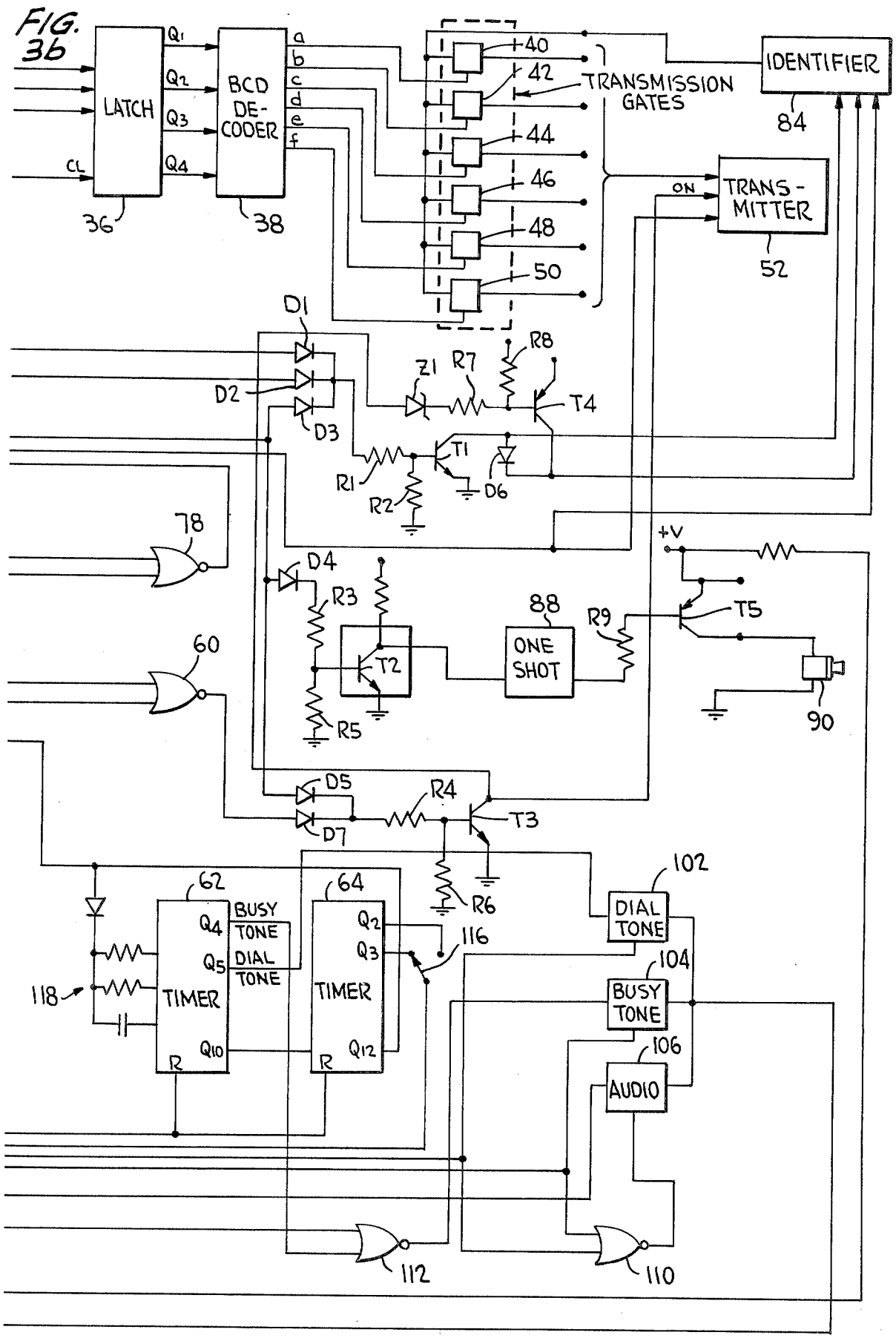

EMERGENCY ROADSIDE TELEPHONE SYSTEM

BACKGROUND OF THE INVENTION

1. Field of the Invention

The present invention pertains to telephone systems and, more particularly, to an emergency telephone terminal for use in a roadside telephone system to permit communication with a central station.

2. Discussion of the Prior Art

There are many occasions where travelers in remote areas need emergency assistance; however, communication has always been a problem in obtaining such assistance. It has been proposed to place telephones at spaced locations along roadways to permit motorists to call an operator and explain whatever problems exist and request desired emergency assistance. One disadvantage of such systems is that verbal communication is required between the caller and the operator such that, when a language barrier exists, it is difficult for the operator to understand what type of emergency assistance is required. Prior art systems have other disadvantages in that wires have been used for communication thereby rendering placement of remote terminals expensive and inflexible as to repositioning of the terminals. When wires are used, power for the remote terminals can be supplied through the wires; however, when wires are not used, power supply has been a problem in that the remote terminal are many times left in an operating condition thereby unduly draining the power supply.

SUMMARY OF THE INVENTION

Accordingly, it is a primary object of the present invention to provide an emergency telephone terminal for use in roadside telephone systems overcoming the above mentioned disadvantages of the prior art.

Another object of the present invention is to permit communication between an emergency telephone terminal and a central station by both voice and the actuation of emergency switches at the emergency telephone terminal.

A further object of the present invention is to provide radio communication between a plurality of emergency telephone terminals positioned along roadways and a central station to permit travelers to communicate with an operator at the central station to obtain emergency assistance.

The present invention has another object in that an emergency telephone terminal for an emergency roadside telephone system includes timing circuitry to automatically disconnect the circuitry thereof three minutes after a handset is lifted off-hook to converse power at the emergency telephone terminal, a sound alarm being provided to permit an operator at a central station to call the emergency telephone back after the automatic disconnection.

Yet an additional object of the present invention is to permit an operator at a central station to test a remote emergency telephone terminal by sending an address code signal to which the emergency telephone terminal responds by sending an identifying code to the central station.

Some of the advantages of the present invention over the prior art are that communication of a need for emergency assistance can be accomplished even when a language barrier exists between a caller at an emergency telephone terminal and an operator at a central station, the emergency telephone terminal can be placed along roadways or in other remote areas without the necessity of connecting wires between the emergency telephone terminal and the central station, and the system is flexible to permit its use in many geographic areas.

The present invention is generally characterized in an emergency telephone terminal for use in an emergency roadside telephone system to communicate with a central station including a transmitter and receiver for communicating with the central station, a handset having a receiver and a transmitter and being movable between on-hook and off-hook positions, a first circuit for connecting the handset transmitter with the transmitter and the handset receiver with the receiver means when the handset is in the off-hook position, a plurality of emergency switches corresponding to various emergency conditions and adapted to be manually actuated, and a second circuit responsive to the handset being if the off-hook position for coupling the emergency switches with the transmitter whereby the emergency telephone terminal permits voice and emergency switch communication with the central station.

Other objects and advantages of the present invention will become apparent from the following description of the preferred embodiment taken in conjunction with the accompanying drawings.

BRIEF DESCRIPTION OF THE DRAWINGS

FIGS. 3a and 3b are schematic diagrams of the control circuitry of the emergency telephone terminal of the present invention.

DESCRIPTION OF THE PREFERRED EMBODIMENT

Figure 2:
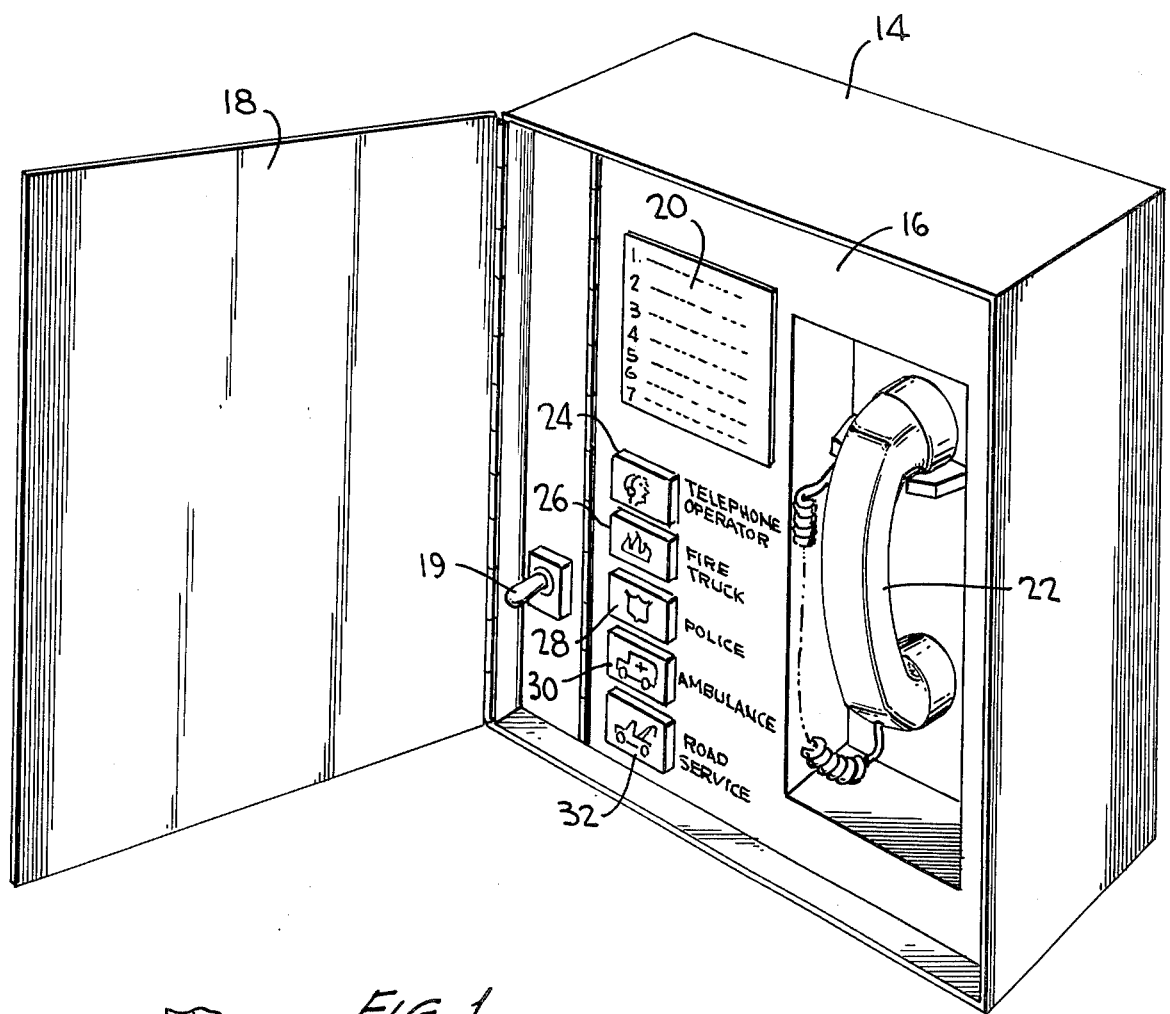
FIG. 2 is a perspective view of the emergency telephone terminal of the present invention.
Figure 1:
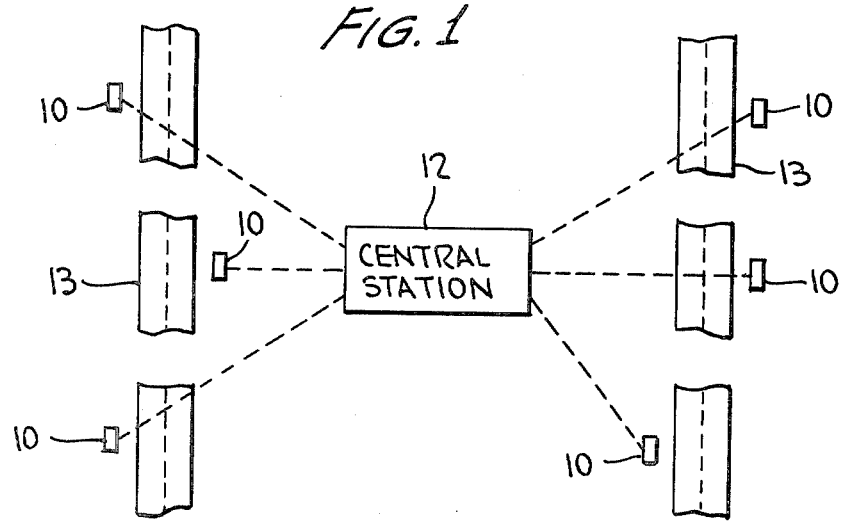
FIG. 1 is a block diagram of an emergency roadside telephone system utilizing emergency telephone terminals according to the present invention.

An emergency roadside telephone system according to the present invention is shown in FIG. 1 and includes a plurality of emergency telephone terminals 10 communicating with a central station 12 by two-way radio. The emergency telephone terminals 10 can be disposed at any desired locations along roadways 13 or in other remote areas where communication for emergency assistance purposes is not readily available. As shown in FIG. 2, each of the emergency telephone terminals 10 has a housing 14 with a panel 16 protected by a hinged door 18. On the panel 14 are a switch 19 operated by movement of the door, operating instructions 20, a handset 22 and emergency push-button switches 24, 26, 28, 30 and 32 for requesting, for example, respectively, a telephone operator, a fire truck, police, an ambulance and road service. Each of the push-button switches has a label adjacent thereto and carries a standard international symbol to permit emergency calls to be placed even when there is a language barrier between a caller and an operator at the central station. Power for emergency telephone terminals 10 is self-contained at each terminal and is provided, preferably, from a twelve-volt battery which can be charged via solar cells mounted on a pole at each terminal. In this manner, the life of the power supplied for the emergency telephone terminals will be extended to reduce maintenance requirements which is highly desirable since the emergency telephone terminals will normally be disposed at remote locations and will, of course, be unattended.

Figure 3A:
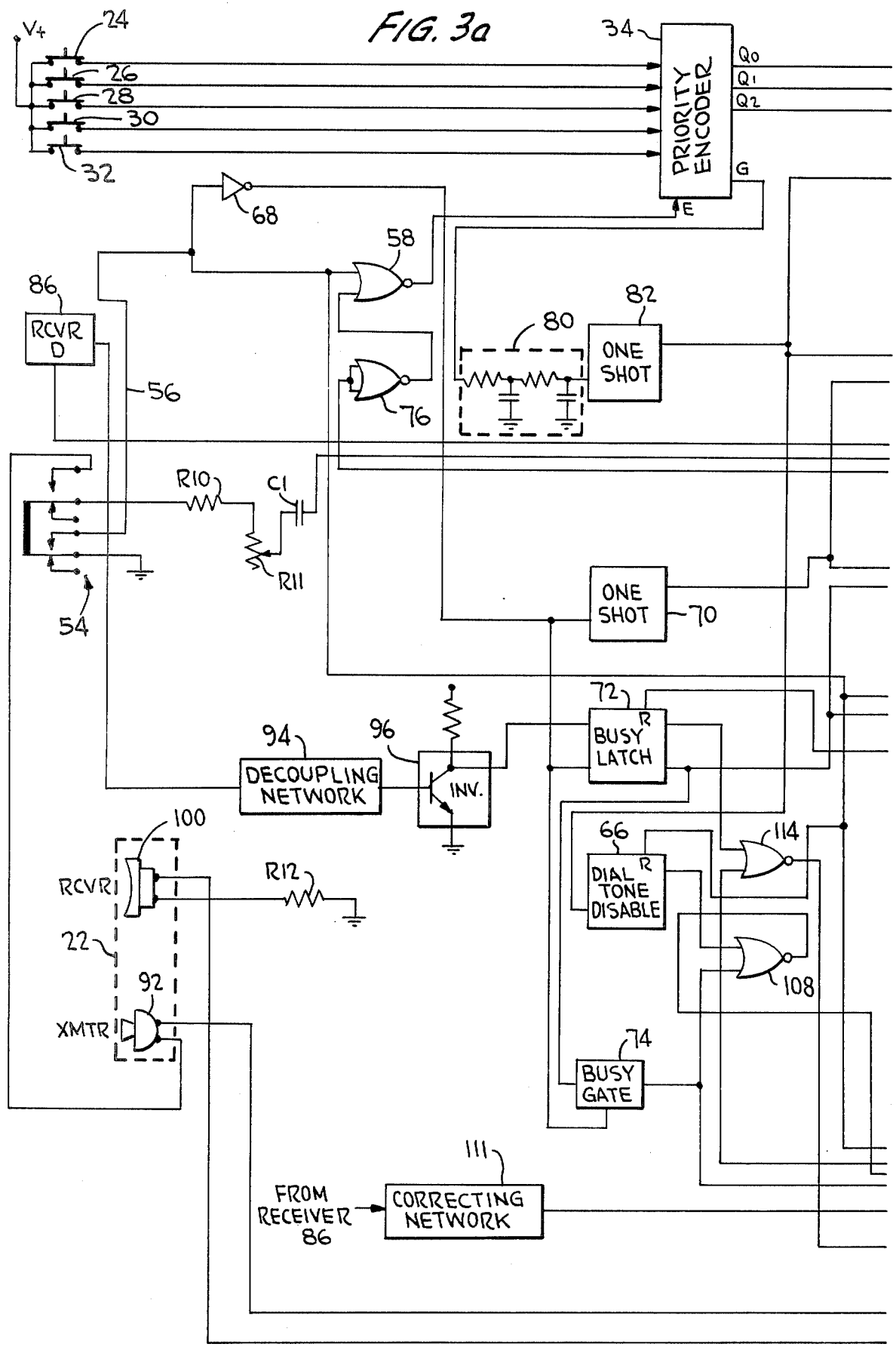

Each emergency telephone terminal 10 includes control circuitry to permit voice communication via handset 22 and communication via emergency switches 24, 26, 28, 30 and 32, as shown in FIGS. 3a and 3b. The emergency switches 24, 26, 28, 30 and 32 are each connected between a source of positive voltage V+ and respective inputs of a priority encoder 34 which has an enable input E, a high-on output G and encoded outputs $Q_0$, $Q_1$ and $Q_2$ supplied to respective inputs of a latch 36. The latch 36 has an input CL and outputs Q1, Q2, Q3 and Q4 supplied to respective inputs of a BCD decoder 38 which has outputs a, b, c, d, e and f supplied, respectively, to control transmission gates 40, 42, 44, 46, 48 and 50, the outputs of the transmission gates being supplied to a conventional radio transmitter 52.

The handset 22 holds a double pole, double throw switch 54 in an on-hook position, as shown in FIG. 3a, when the handset is placed on the cradle, as shown in FIG. 2, such that when the handset is lifted to an off-hook position, an off-hook ground signal is supplied via lead 56 as an input to NOR gates 58 and 60 and as reset inputs to timers 62 and 64 and a dial tone disable latch 66. the off-hook signal is also supplied via an inverter 68 to a one-shot 70, to one input of a busy latch 72 and to a busy gate 74. NOR gate 58 receives a second input from the output of a NOR gate 76 which receives its input from the output of a NOR gate 78. The output of NOR gate 58 is supplied to input E of priority encoder 34, and the output G of the priority encoder is connected via an R-C delay network 80 wit a one-shot 82. The output of one-shot 82 is supplied to input CL of latch 36, to an input of dial tone disable latch 66 and through a diode D1 and a resistor R1 to the base of an NPN transistor T1 which has a collector connected with an identifier circuit 84, the base of transistor T1 being connected to ground through a resistor R2. Diode D1 along with diodes D2 and D3 form a diode OR gate with Diode D2 receiving the output from one-shot 70 and diode D3 connected with a selective call decode output D of a conventional radio receiver 86 from the base station, the receiver output also being supplied via a diode D4 and a resistor R3 to the base of an NPN transistor T2 and via a diode D5 and a resistor R4 to the base of an NPN transistor T3. The bases of transistors T2 and T3 have grounded emitters and bases connected to ground, respectively, through resistors R5 and R6 with the collector of transistor T2 being connected with a one-shot 88 and the collector of transistor T3 being connected with transmitter 52 and via a Zener diode Z1 and a resistor R7 with the base of a PNP transistor T4 having its emitter connected to a positive potential and its base connected to the positive potential via resistor R8. The collector of transistor T4 is connected to supply an input to identifier circuit 84 and a diode D6 is connected between the collectors of transistors T1 and T4. The output of one-shot 88 is connected via a resistor R9 with the base of a PNP transistor T5 having an emitter connected with a positive potential and a collector connected through a sound alarm device 90 to ground. Hook switch 54 has a contact connected with a transmitter 92 of the handset 22 such that when the hook switch is in the off-hook position, the transmitter is connected via modulation audio set resistors R10 and R11 and a capacitor C1 as a third input to identifier circuit 84 and also as an input to transmitter 52.

The receiver 86 has a low level output connected via a decoupling network 94 and a transistor inverter 96 with an input of busy latch 72. The handset 22 has a receiver 100 with one terminal connected to ground via a resistor R12 and a second terminal receiving the output of a dial tone transmission gate 102, a busy tone transmission gate 104 and an audio transmission gate 106. The dial tone disable latch 66 has an output supplied to a NOR gate 108 which also receives an input from busy gate 74 and has an output supplied to control dial tone transmission gate 102 and as an input to a NOR gate 110 having an output controlling audio gate 106 which receives an input from receiver 86 through a correcting network 111. Timer 62 has a busy tone output Q4 supplied to a NOR gate 112 which receives a second input from a NOR gate 114 receiving inputs from the busy output of busy latch 72 and from either of outputs Q2 or Q3 of timer 64 under the control of a single pole, double throw switch 116. Timer 62 has a dial tone output Q5 supplying an input to dial tone gate 102, and timer 64 has a time-out output Q12 supplied to a reset input of busy latch 72 and to timer 62 via a diode-resistor-capacitor network 118.

In operation, should a traveler require emergency assistance, he would proceed to the nearest emergency telephone terminal 10, open the door 18 and read the instructions which indicate that he lift the handset 22 off-hook and depress the emergency push-button switches 24, 26, 28, 30 and 32 corresponding to the type of emergency assistance required. If the caller hears a ringing sound, an operator at the central station 12 will answer, and a conversation can be conducted between the caller and the operator. If the caller hears an interrupted tone (busy signal), it indicates that the central station is busy, and the caller by written instruction is told to replace the handset on the hook and try again. The instructions indicate that the call should be completed within three minutes; and, once the call is completed, the handset 22 is replaced and the door 18 shut. The switch 19 is connected in series with the power supply such that power is supplied to the control circuitry and a lamp for illuminating the panel 16 only when the door 18 is open in order to conserve electricity.

The identifier circuit 84 is conventional and can be any circuit which supplies an identification code when enabled such as, for example, Bramco model No. E3. The identification code for each emergency telephone terminal is determined by various pin connections in the identifier circuit 84 which are normally set prior to installation but can be reset at any time.

The transmitter 52 and receiver 86 are standard components of UHF-VHF radio systems for providing two-way duplex communication; and, similarly, the telephone handset 22 is conventional. The functions provided by the logic circuits of FIGS. 3a and 3b could, of course, be implemented with other logic circuitry and schemes.

More particularly, with reference to FIGS. 3a and 3b, when the handset 22 is lifted, an off-hook signal is supplied to input E of priority encoder 34 via NOR gate 58 to enable the encoder to receive inputs from emergency push-button switches 24, 26, 28, 30 and/or 32. The priority encoder is programmed to provide binary encoded output signals at $Q_0$, $Q_1$ and $Q_2$ representative of the emergency switches actuated by the caller on a priority basis such that the output of the encoder will correspond with the emergency switch of highest priority. When an input from the emergency switches is received with the off-hook signal present, the priority encoder supplies a gating signal at G which is delayed by circuit 80 prior to triggering one-shot 82. The output of one-shot 82 is supplied to input CL of latch 36 to clear the latch and then latch the binary encoded output of priority encoder 34 therein and is supplied to dial tone disable latch 66 to disable the dial tone heard by the caller on handset receiver 100 via dial tone gate 102. The output of one-shot 82 also activates identifier circuit 84 via diode D1 and transistor T1 to supply the identifying code associated with the particular emergency telephone terminal 10 to transmission gates 40, 42, 44, 46 and 48 which receive inputs from BCD decoder 38 according to the latched data in latch 36 representative of the actuated emergency push-button switches, the identifier circuit 84 being enabled by the off-hook signal from hook switch 54 via NOR gate 60, diode D7 and transistors T3 and T4. The anabling of priority encoder 34 via NOR gate 58 is dependent upon the absence of a busy signal to NOR gate 58 via busy latch 72 and NOR gates 78 and 76. The identifier circuit 84 is initially enabled by the off-hook signal which is inverted at 68 to trigger one-shot 70, the output of one-shot 70 enabling the indentifier circuit 84 via diode D2 and transistor T1 and being combined with the not busy output of busy latch 72 at NOR gate 78 to inhibit the priority encoder 34 via NOR gates 76 and 58 until the identification code is transmitted by transmitter 52. In this manner, the identification code associated with the calling emergency telephone terminal is supplied through the transmission gates representative of a signal corresponding to the emergency assistance required for communication to the central station 12 via transmitter 52 which is activated by the off-hook and not busy signals supplied to NOR gate 60 which renders transistor T3 conductive.

The off-hook signal also resets timers 62 and 64 and dial tone disable circuit 66, the timers 62 and 64 being interconnected to produce an output at Q12 to reset busy latch 72 three minutes after the off-hook signal is initiated. The timer 62 includes a clock circuit operating, for example, at 11,636 Hz and binary dividers to provide a 729 Hz busy signal on output Q4 and a 368 Hz dial tone on output Q5. The busy signal is gated to busy tone gate 104 by NOR gate 112 under the control of NOR gate 114 which receives the busy output of busy latch 72 and either output Q2 or Q3 of timer 64 which produce 0.35 and 0.7 second busy pulses, respectively.

The decode output D of receiver 86 enables identifier circuit 84 via diode D3 and transistor T1 and enables transmitter 52 via diode D5 and transistor T3. In this manner, the operator at the central office 12 can test each emergency telephone terminal 10 by transmitting an address code for the emergency telephone terminal to be tested which produces decode output D at receiver 86 to enable the identifier circuit 84 and the transmitter 52 to transmit the identification code for the addressed emergency telephone terminal to the central station. The sound alarm 90 will sound for five seconds when the emergency telephone terminal is addressed since one-shot 88 is also triggered to drive transistor T5 by the decode output D via diode D4 and inverter transistor T2, the sound alarm 90 being used in the manner of a ringer in a conventional telephone system to indicate that the emergency telephone terminal has been addressed by the central station.

The squelch or low-level signal from receiver 86 is decoupled by network 94 and inverted by transistor 96 to set busy latch 72 in the busy state to produce a busy signal when a low signal is received from inverter 96 and an off-hook signal is supplied to the other input of the busy latch, and busy latch 72 will be in the not busy state when a high signal is received from inverter 96 along with an off-hook signal at the other input. The busy signal is supplied to the handset receiver 100 by gating the output at Q2 or Q3 through NOR gate 114 in accordance with the state of busy latch 72, the busy signal from output Q4 of timer 62 being gated to busy tone gate 104 by NOR gate 112 under the control of the output of NOR gate 114. The busy tone gate 104 is controlled by the output of busy gate 74 which is enabled by the off-hook signal to pass the not busy signal from busy latch 72, and the output from busy tone gate 104 is supplied to the handset receiver 100.

Audio from receiver 86 is coupled through correcting network 111 to audio transmission gate 106 controlled by NOR gate 110 which is controlled by the output from busy gate 74 and NOR gate 108 such that audio is supplied to the handset receiver 100 only when there is no busy signal and the dial tone has been disabled. The dial tone is supplied from output Q5 of timer 62 through dial tone transmission gate 102 to the handset receiver 100, the dial tone transmission gate being controlled by the output of NOR gate 108 in accordance with the output of dial tone disable latch 66 and busy gate 74 such that when the handset is lifted off-hook, the dial tone is supplied to the handset receiver unless the central station is busy which causes busy latch 72 to provide a busy signal and busy gate 74 to be enabled to provide a busy tone at the handset receiver as previously described. The NOR gates 108, 112 and 114 control the dial tone transmission gate 102, busy tone transmission gate 104 and audio transmission gate 106 in such a manner as to prevent any two transmission gates from being simultaneously enabled thereby permitting the outputs of the transmission gates to be combined to provide either dial tone, busy tone or audio to the handset receiver.

Inasmuch as the present invention is subject to many variations, modification and changes in detail, it is intended that all matter discussed above or shown in the accompanying drawings be interpreted as illustrative and not in a limiting sense.

What is claimed is:

1. An emergency telephone terminal for use in an emergency roadside telephone system to communicate with a central station comprising
   transmitter means and receiver means for communicating with the central station;
   a handset having a receiver and a transmitter and being movable between on-hook and off-hook positions;
   first circuit means for connecting said handset transmitter with said transmitter means and said handset receiver with said receiver means when said handset is in said off-hook position;
   a plurality of emergency switches symbolically marked with pictorial symbols to correspond to various emergency conditions and adapted to be manually actuated; and
   second circuit means responsive to said handset being in said off-hook position for coupling said emergency switches with said transmitter means whereby said emergency telephone terminal permits voice and emergency switch communications with said central station.

2. An emergency telephone terminal as recited in claim 1 and further comprising timer means initiated when said handset is moved to the off-hook position and operative after a predetermined period of time to cause said first circuit means to disconnect said handset transmitter and receiver from said transmitter means and said receiver means.

3. An emergency telephone terminal as recited in claim 2 and further comprising an identifier circuit having an identifying code and third circuit means for coupling said identifying code to said transmitter means when said handset is in said off-hook position.

4. An emergency telephone terminal as recited in claim 3 and further comprising decoder means coupled with said receiver means for operating said identifier circuit to couple said identifying code to said transmitter means when said receiver means receives an address code transmitted by the central station to permit testing of said emergency telephone terminal.

5. An emergency telephone terminal as recited in claim 4 and further comprising sound alarm means connected with said decoder means to generate a sound when said receiver means receives the address code transmitted by the central station.

6. An emergency telephone terminal as recited in claim 2 and further comprising sound alarm means, and decoder means coupled with said receiver means and said sound alarm means, said decoder means being responsive to said receiver means receiving an address code transmitted by the central station to energize said sound alarm means whereby an operator at the central station can call back said emergency telephone terminal after said predetermined period of time has elapsed.

7. An emergency telephone terminal as recited in claim 2 and further comprising means for generating a busy tone and a dial tone, dial tone circuit means for coupling said dial tone to said handset receiver when said handset is moved to said off-hook position and busy tone circuit means including decoupling means responsive to a signal from said receiver means when the central station is busy to inhibit said dial tone circuit means and couple said busy tone to said handset receiver when said handset is moved to said off-hook condition.

8. An emergency telephone terminal as recited in claim 2 wherein each of said emergency switches has a symbol associated therewith representing the emergency assistance requested by operating each switch whereby emergency assistance can be requested even when a language barrier exists between a caller at said emergency telephone terminal and an operator at the central station.

* * * * *